Jan. 15, 1963    J. P. HAMILTON    3,073,609
BELL AND SPIGOT TILE AND SEAL JOINT THEREFOR
Filed Nov. 14, 1960    2 Sheets-Sheet 1
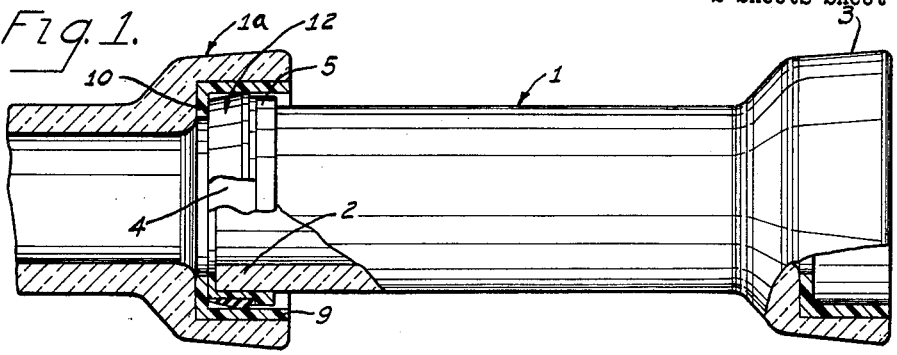
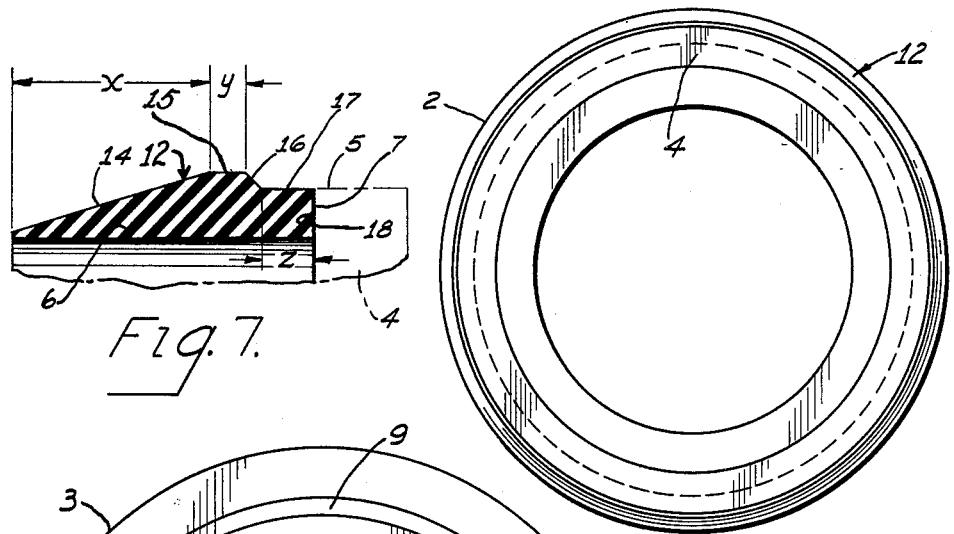
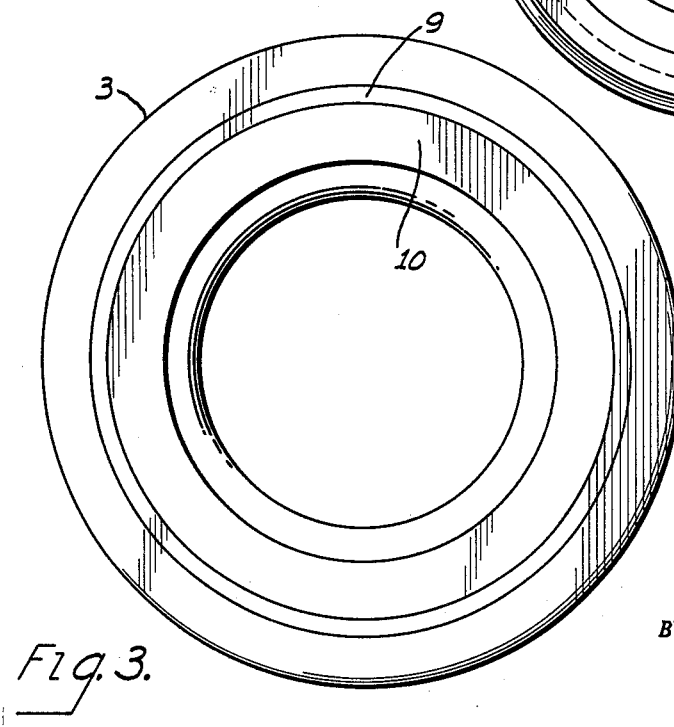
INVENTOR.
JAMES P. HAMILTON
BY
his ATTORNEY.

INVENTOR.
JAMES P. HAMILTON
BY
ATTORNEY

United States Patent Office 3,073,609
Patented Jan. 15, 1963

3,073,609
BELL AND SPIGOT TILE AND SEAL JOINT THEREFOR
James P. Hamilton, East Liverpool, Ohio, assignor to American Vitrified Products Company, Cleveland, Ohio, a corporation of New Jersey
Filed Nov. 14, 1960, Ser. No. 69,194
3 Claims. (Cl. 277—168)

This invention relates to vitrified tile of the bell and spigot type, and particularly to sewer tile of this type which are to be buried in trenches whereby they may become subject to very heavy distributed loads imposed by saturated superposed earth or by irregularly distributed concentrated loads due to superposed traffic and the like.

As more fully described in my copending application, Serial No. 3,625, filed January 20, 1960, considerable difficulty has been encountered in providing proper joints which not only can be effectively coupled and uncoupled when desired, but also which remain in effective sealing relation during use, even when the axes of the tile become angularly disposed or offset relative to each other due to superposed loads, settling of the earth, and the like. The reasons for these difficulties and the manner of their origin are disclosed in the above-entitled application, and are not repeated herein.

Therein, too, is illustrated a joint of which the seal is effected by a gasket in the form of an O-ring. Load bearing portions are provided adjacent the seal, one on the bell of one tile and one on the spigot of a connected tile. These portions are positioned relative to each other so as to be capable of engaging and supporting the load before the offsetting or biasing of the axes of the joined tiles by the load is such that the O-ring becomes overcompressed at the side of the tiles at which the bearing portions are in contact, or is out of pressure contact with the sealing surfaces of the bell and spigot at the location diametrically opposite from the portions which are in engagement. This prior joint, while satisfactory in operation, introduces some inconveniences or difficulties in manufacture and installation.

The present invention is directed to a joint which employs a special gasket instead of the O-ring, and of which the parts forming the joint are more easily manufactured, coupled and uncoupled.

The specific objects and advantages of the present invention will become apparent from the following description, wherein reference is made to the drawings, in which:

FIG. 1 is a diagrammatic side elevation of a portion of a pair of tiles embodying the principles of the present invention;

FIG. 2 is an enlarged end view of one of the tiles of FIG. 1 as viewed from the spigot end;

FIG. 3 is an enlarged end view of one of the tiles of FIG. 1 as viewed from the bell end;

FIG. 7 is an enlarged fragmentary cross sectional view of the gasket, showing the important contour features of the outer peripheral surface thereof.

Figure 4:
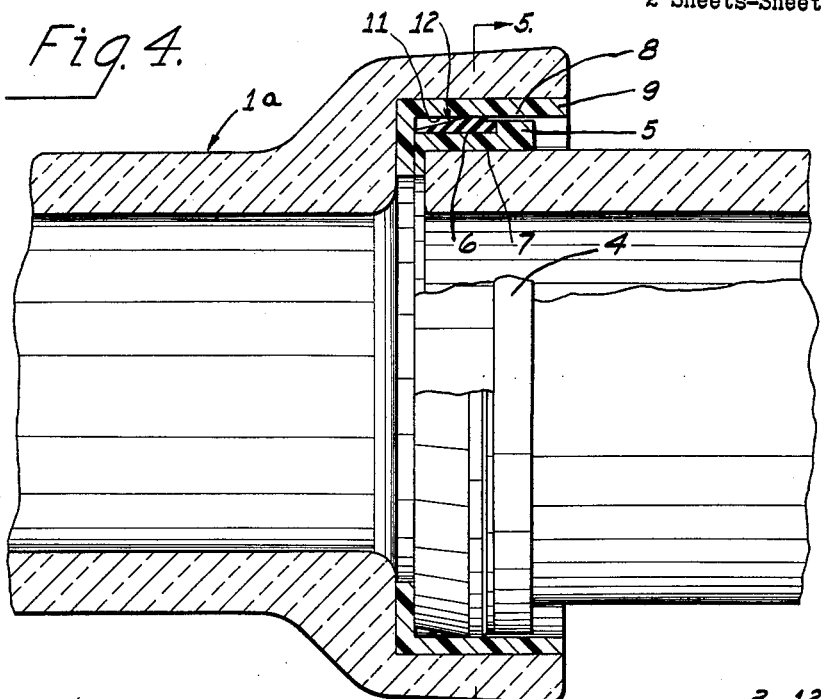
FIG. 4 is an enlarged fragmentary longitudinal sectional view through the bell end of one tile and the spigot end of another tile coupled therewith, illustrating the joint of the present invention.

Referring first to FIG. 1, the joint of the present invention is incorporated in a tile 1 having its spigot end accommodated in sealed relation in the bell of a duplicate tile 1a. Since the coupled tile are identical in form and function, the tile 1 only is described herein in detail.

The tile 1 is, except for the joint parts, a conventional ceramic sewer tile having at one end a spigot 2 and at the opposite end a bell 3. Permanently bonded on the spigot end of the tile, preferably by molding thereon, is a collar 4 which is accurately contoured exteriorly to true circular cross section. The collar 4 has a load bearing portion in the form of a radially outwardly extending annular flange 5. Adjacent thereto it has a reduced diameter cylindrical portion 6 coaxial therewith. A radial shoulder 7 is disposed between the flange 5 and portion 6. The cylindrical portion 6 may have a slight draft of one or two degrees for ease in removal from the mold by which the collar is formed.

The outer surface 8 of the flange 5 is a load bearing surface.

The bell 3 has an internal annular liner or sleeve 9 with an inwardly extending radial flange 10. The sleeve 9 and flange 10 are permanently bonded to the inner wall of the bell in the position illustrated. The manner of bonding the collar 4 onto the spigot end and the sleeve 9 to the bell end of the tile may be by the method disclosed in the above copending application.

The sleeve 9 is load bearing and has an interior surface portion 11 a part of which is positioned axially of the bell so as to be aligned radially with the surface 5 of the spigot collar. The surfaces 5 and 11 are placed relatively close together so that they will come into contact if the portions of the two tile at the juncture should become offset slightly radially or become disposed with their axes slightly on a bias to each other. When in contact, they prevent further offsetting or biasing of the axis of one tile relative to that of the other. The engagement of these surfaces likewise protects the seal, as disclosed in the above copending application.

In order to provide an effective seal between the bell and spigot, a gasket 12 is provided. The gasket 12, while held expanded, is slid into position on the cylindrical portion 6 of the collar, and, when so placed, is released and thereupon draws tightly thereabout so as to hold itself in place readily without any adhesives. The gasket 12 extends from the outer end of the collar 4 rearwardly toward the shoulder 7. Beginning at its outer end and extending partway toward the shoulder 7, it has a frusto-conical portion 14 of which the larger diameter base is nearer the shoulder 7. This axial extent of this portion is indicated by the dimension $x$ in FIG. 7. Next, in the direction toward the shoulder 7, is a cylindrical portion or sealing portion 15 which extends a substantial distance endwise of the gasket, as indicated in FIG. 7 by the dimension $y$. The sealing portion is of substantial width, endwise of the tile, and adapted to be placed in engagement with the inner wall surface portion 11 of the sleeve 9 under resilient pressure contact for effecting a seal when two tiles are connected. Next, in a direction toward the shoulder 7, is a rearwardly sloping annular shoulder portion 16 which terminates in a rear hub portion 17 of appreciable axial extent, as indicated by the dimension $z$ in FIG. 7.

The rear edge 18 of the hub portion 17 generally engages the shoulder 7 so as to resist slippage of the gasket axially relative to the collar.

The diameter of the external surface of the hub portion 17 is preferably the same as that of the surface 5.

The hub portion 17 is of substantial extent axially of the tile for reinforcing the sealing portion 15 against deflection or radial collapse.

The external diameter of the sealing portion 15 is greater than that of the surface 5, and greater than the internal diameter of the sleeve 9 at its sealing surface.

Figure 6:
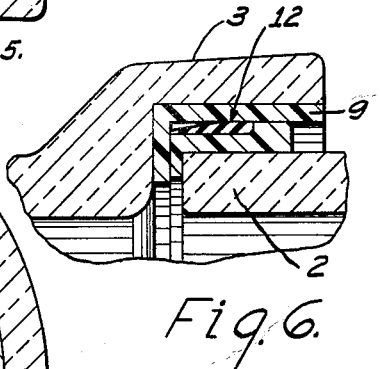
FIG. 6 is an enlarged fragmentary view of the joined tiles of FIG. 4, showing the seal between the tiles and gasket.
Figure 5:
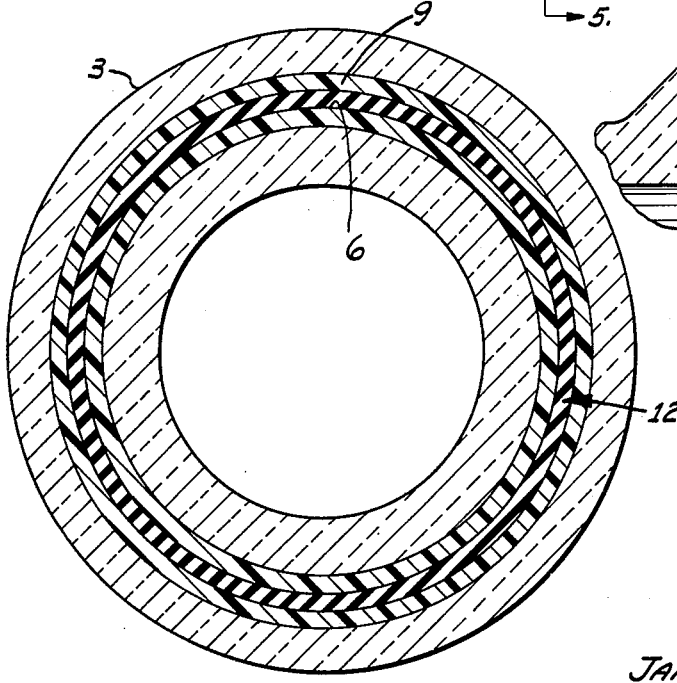
FIG. 5 is a cross sectional view taken on the line 5—5 of FIG. 4.

The difference in diameter is such that, when the spigot of one tile is forced into the bell of the other into coupling position, the surface 15 will engage and seal against the inner surface of the sleeve 9 under substantial radial pressure due to the compression and resiliency of the gasket 12. Normally the surface 5 is out of contact with the surface 11. However, as illustrated in FIG. 6, if sufficient concentrated weights are applied on the bell, and the bell at the opposite side is not fully supported or is supported on soft earth, there is a tendency for the axes of the tiles to become offset radially and further compress the gasket 12 at the top. Due to the limited space between the surfaces 11 and 5, they engage each other before the gasket is fully compressed at that side of the tiles and before it is fully expanded or breaks its seal at the opposite or bottom side. The same effect results when the bell is firmly supported but the tile having its spigot end therein is not.

In either event, as a result, the gasket 12 is relieved from excessive stresses and the tiles at the same time are prevented from becoming offset radially or biased in such a manner that the seal between the gasket and the sleeve is broken.

The collar 4 and sleeve 9 preferably are polyester resin which is relatively stiff and compression resistant even under long sustained pressures. The resin should be the type which resists the usual ground acids, sewage acids and alkalies, and the like to which such drain tiles are customarily subjected.

The particular degree of rigidity of the sleeve material and its resistance depend upon the load to be carried and the service to be performed by the tile. The type and amount of resistance and other characteristics desired can be obtained by supplying the specified limits to the compounders of the resins. The invention is not limited to the specific compounds used. A number of polyester compounds and resins are satisfactory and have the properties desired. Some examples are given in the above entitled copending application.

The gasket, on the other hand, is formed of elastomeric material, such as an elastic vinyl resin, a specific example being a vinyl plastisol. Here again the specific composition of the gasket is not important. It is important that it be resilient, retain its resilience even when compressed for long periods, form an effective seal with the surface of the sleeve, and resist deterioration by ground and sewage acids and the like. The modulus of elasticity is such that when the surfaces 5 and 11 are together at one side of the axis of the tiles, and hence spaced their maximum distance apart at the diametrically opposite side of the axis, the gasket does not reach its fully compressed condition at the one side or its fully expanded condition at the opposite side. Thus the seal remains effective.

With this sealing arrangement, the tile can be shipped to the field for use and the gaskets separately packaged and shipped. At the installation site, all that is necessary is to place the gasket on the end of the spigot of a tile, and then, preferably after wetting the interior surface of the sleeve 9 of the companion tile and the exterior surface of the gasket, inserting the spigot into the bell, thus compressing the gasket 12 and causing it to form a resilient seal with both the inner surface of the sleeve 9 and the outer surface of the cylindrical portion 5 of the sleeve 4.

Having thus described my invention, I claim:

1. A tile having a spigot at one end and a bell at the other end, the bell having formed thereon a trued annular internal sealing surface of circular cross section, the spigot end having formed thereon a trued annular external sealing surface, said surfaces being circular in cross section and so positioned endwise of the tile and of such a diameter that, should the tile be joined with two duplicate tiles, the sealing surfaces of the spigot and bell, respectively, would be aligned radially with, and in radially spaced relation to, the cooperable sealing surfaces of the bell of one duplicate tile and of the spigot of the other duplicate tile, for accommodating resilient sealing gaskets in compressed condition respectively, between the aligned sealing surfaces, said gaskets each being a preformed annulus of resilient elastomeric material normally of smaller internal diameter than the spigot sealing surface and in tight stretched fitting engagement with the sealing surface of its associated spigot, each annulus having a tapered portion with an exterior peripheral surface which is smooth and, in installed position of the annulus, is circular in cross section and of progressively increasing diameter in a direction away from the spigot end of the associated tile, and which is disposed with its smaller diameter at the spigot end of the associated tile, said annulus having a sealing portion with a cylindrical sealing surface of substantial extent endwise of the tile, adjacent the larger end of the tapered portion, and said bell and spigot each having a load bearing surface portion adjacent the end of its sealing surface, said load bearing surface portions of an interfitting bell and spigot being at the end of the cylindrical sealing surface of the annulus opposite from said tapered portion, and of radial extent such that, in interfitting duplicate tiles, they will be radially spaced a limited distance so as to engage and limit the transverse movement of the interfitting bell and spigot to less than that which would be permitted by full compression of the sealing portion of the annulus at one side of its axis and to less than that which would permit the annulus to reach its substantially fully uncompressed condition at the diametrically opposite side of the axis, said spigot having an annular radially extending positioning shoulder adjacent the inner end of its sealing surface and facing the adjacent end of the tile, and the annulus having an annular radially extending shoulder at its inner end juxtaposed thereagainst.

2. A tile according to claim 1 wherein said annulus is of vinyl resin and has an annular reinforcing portion at the end of the cylindrical sealing portion opposite from said tapered portion, and said reinforcing portion is of less external diameter than the cylindrical sealing surface of the annulus and extends a substantial distance from the sealing portion of the annulus in a direction away from the end of the spigot, and the shoulder of the annulus is on the reinforcing portion.

3. The tile according to claim 2 wherein the smaller diameter end of the tapered portion has a feather edge, and said tapered portion is longer than the axial length of the sealing surface of the annulus.

References Cited in the file of this patent

UNITED STATES PATENTS

| 340,267 | Westinghouse | Apr. 20, 1886 |
| 2,561,884 | Perrow | July 24, 1951 |

FOREIGN PATENTS

| 560,772 | Canada | July 22, 1958 |